United States Patent [19]

Sorensen

[11] Patent Number: 5,486,138
[45] Date of Patent: Jan. 23, 1996

[54] AIR-POLLUTION REDUCTION METHOD AND SYSTEM FOR THE INTERIOR OF AN AUTOMOBILE

[76] Inventor: Jens O. Sorensen, P.O. Box 2274, Rancho Santa Fe, Calif. 92067

[21] Appl. No.: 277,963

[22] Filed: Jul. 20, 1994

[51] Int. Cl.⁶ ........................................... B60H 3/06
[52] U.S. Cl. ...................... 454/75; 454/139; 454/158
[58] Field of Search ........................... 454/75, 139, 141, 454/143, 158

[56] References Cited

U.S. PATENT DOCUMENTS

| | | |
|---|---|---|
| 3,403,855 | 10/1968 | Bouthors et al. ............... 454/75 X |
| 3,587,439 | 6/1971 | Mercier ........................... 454/75 |
| 3,845,700 | 11/1974 | Lefeuvre ......................... 454/75 |
| 4,111,106 | 9/1978 | Burns . |
| 4,259,722 | 3/1981 | Iwata . |
| 4,278,922 | 7/1981 | Grebe ............................. 454/75 X |
| 4,333,606 | 6/1982 | Shimada . |
| 4,352,321 | 10/1982 | Fukui . |
| 4,437,391 | 3/1984 | Eguchi . |
| 4,458,593 | 7/1984 | Fukui . |
| 4,478,049 | 10/1984 | Fukui . |
| 4,733,605 | 3/1988 | Hölter . |
| 4,742,763 | 5/1988 | Hölter . |
| 4,875,406 | 10/1989 | Hölter . |
| 4,882,287 | 11/1989 | Hölter . |
| 4,992,965 | 2/1991 | Hölter . |
| 5,009,148 | 4/1991 | Karg ................................ 454/75 |
| 5,062,065 | 10/1991 | Laupe . |
| 5,066,466 | 11/1991 | Hölter . |
| 5,205,782 | 4/1993 | Ohba .............................. 454/141 |
| 5,221,292 | 6/1993 | Aoyama . |
| 5,259,813 | 11/1993 | Abthoff .......................... 454/75 |

FOREIGN PATENT DOCUMENTS

| | | | |
|---|---|---|---|
| 0053394 | 6/1982 | European Pat. Off. . | |
| 0042287 | 12/1984 | European Pat. Off. . | |
| 395904 | 11/1990 | European Pat. Off. | 454/75 |
| 0448547 | 9/1991 | European Pat. Off. . | |
| 1067314 | 6/1954 | France | 454/75 |
| 2903643 | 8/1980 | Germany | 454/75 |
| 3006554 | 8/1981 | Germany | 454/75 |
| 3601620 | 9/1986 | Germany | 454/75 |
| 3801636 | 7/1989 | Germany | 454/75 |
| 145015 | 11/1980 | Japan | 454/75 |
| 1442865 | 7/1976 | United Kingdom | 454/75 |

*Primary Examiner*—Harold Joyce
*Attorney, Agent, or Firm*—Don E. Erickson

[57] ABSTRACT

A method of reducing the level of air pollution in the interior of a vehicle having a controllable air intake system leading to the interior of the vehicle, and a detection system for detecting one or more conditions, comprising the steps of (a) detecting the one or more conditions, and (b) controlling air intake to the interior of the vehicle in response to such detection, so that the one or more conditions are causing and/or being the result of a potential energy to kinetic energy conversion of the vehicle and/of by the one or more conditions being the physical inclination of the vehicle. "Causing and/or being the result of" as used herein means "directly or indirectly causing and/or being the result of."

20 Claims, 1 Drawing Sheet

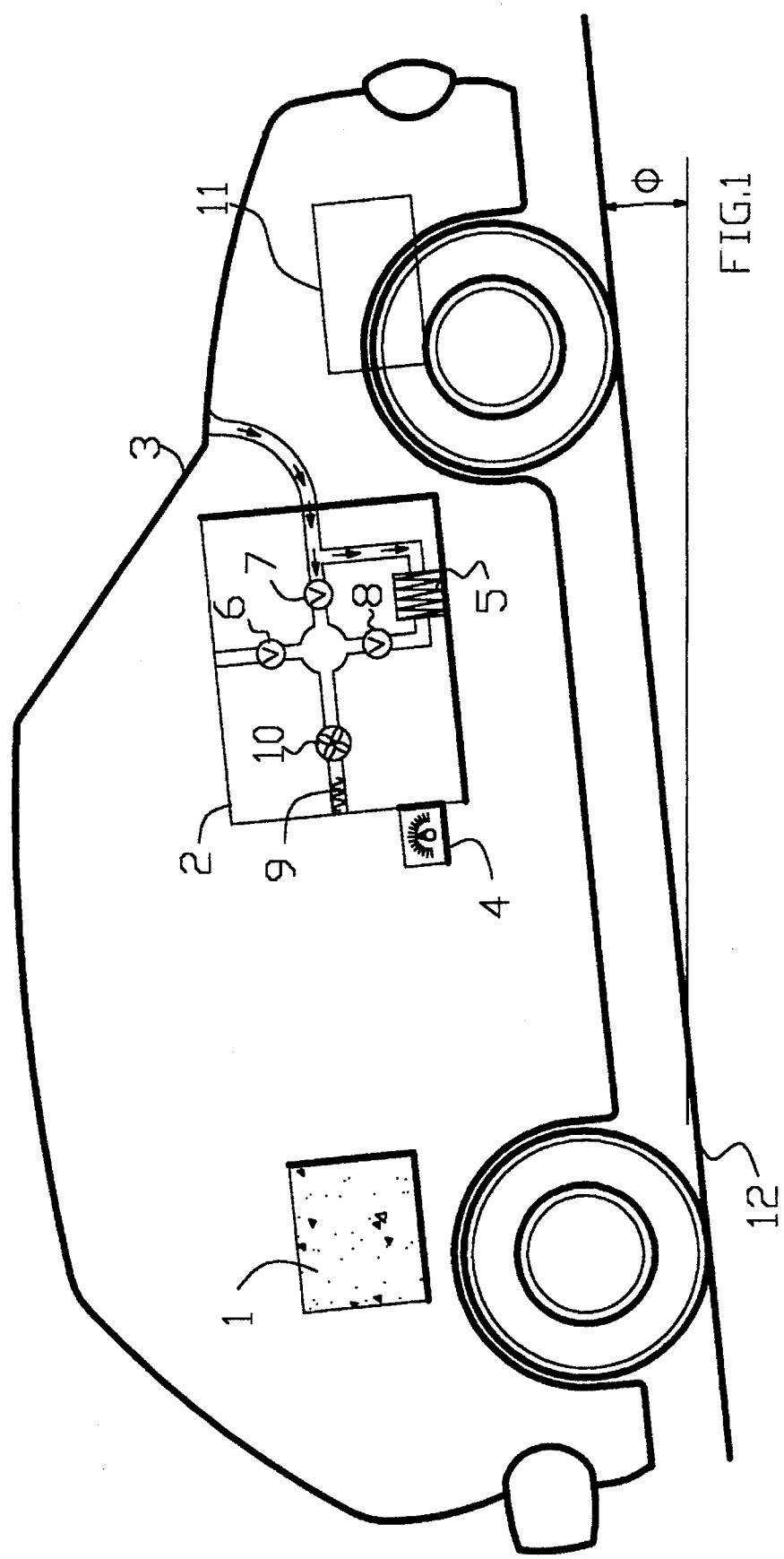

AIR-POLLUTION REDUCTION METHOD AND SYSTEM FOR THE INTERIOR OF AN AUTOMOBILE

BACKGROUND OF THE INVENTION

The present invention pertains to a method and a system that are useful for reducing air pollution in the interior of a vehicle.

Heretofore a method of, and a system for, reducing the level of air pollution in the interior of a vehicle have been known which comprise a controllable air intake system leading to said interior of the vehicle, and a detection system for detecting one or more conditions, using the steps of (a) detecting said one or more conditions, and (b) controlling air intake to said interior of the vehicle in response to such detection.

Conditions detected by such prior art controllable air intake systems can be catagorized into three types, 1) detecting the presence of contaminants in the ambient air, and then filtering and/or controlling the intake of ambient air accordingly, 2) measuring air flow pressure into the air intake ducts, and then regulating the flow of air into the passenger compartment of the vehicle accordingly, and 3) detecting the speed of the vehicle, and then controlling the flow of air to the passenger compartment of the vehicle in response to the detected speed.

Examples of such prior art are described in the following patents: U.S. Pat. Nos. 5,259,813, 5,221,292, 5,066,466, 4,992,965, 4,882,287, 4,875,406, 4,742,763, 4,478,049, 4,437,391, 4,352,321, 4,259,722, EP 0053,394 and EP 0042, 28. Such prior art has been dependent upon a complicated and expensive detection system required for analyzing polluted air.

SUMMARY OF THE INVENTION

The present invention provides a method of reducing the level of air pollution in the interior of a vehicle having a controllable air intake system leading to said interior of the vehicle, and a detection system for detecting one or more conditions, comprising the steps of:

(a) detecting said one or more conditions;

(b) controlling air intake to said interior of the vehicle in response to such detection; so that said one or more conditions are causing and/or being the result of a potential energy to kinetic energy conversion of said vehicle and/or by said one or more conditions being the physical inclination of the vehicle. "Causing and/or being the result of" as used herein means "directly or indirectly causing and/or being the result of."

The present invention further provides a system for reducing the level of air pollution in the interior of a vehicle comprising:

a controllable air intake system leading to said interior of the vehicle;

a detection system for detecting one or more conditions; and means for controlling air intake to said interior of the vehicle in response to such detection, so that said one or more conditions are causing and/or being the result of a potential energy to kinetic energy conversion of said vehicle and/or by said one or more conditions being the physical inclination of the vehicle.

The present invention is not a one-hundred percent secure method of, and system for, preventing air intake of polluted air, but it normally at a high efficiency does reduce the average level of air intake of polluted air to the interior of a vehicle in a simple non-complicated and inexpensive manner. The reason that the method and system of the invention is able to reach such high efficiency is as follows. Normally polluted air intake comes from exhaust of other vehicles around and particularly in from of the vehicle of the invention. Such air pollution has been shown to increase when such other vehicles at a high level convert potential energy such as fuel to kinetic energy such as speed of such other vehicles and/or when such other vehicles drive at a steep physical incline such as when they travel up a hill. It has also been shown that when the surrounding vehicles are under such conditions with increased pollution there is a high degree of likelihood that the vehicle of the invention will be under similar conditions of at a high level converting potential energy to kinetic energy and/or the vehicle of the invention having a steep physical inclination. Therefore when air intake is reduced and/or filtered whenever the vehicle of the invention is creating polluted air then there is a high degree of likelihood that the polluted air created by the surrounding vehicles does not pollute the interior of the vehicle of the invention.

The present invention is not dependent upon any complicated or expensive detection system for analyzing polluted air, although it is possible to use such prior art system in combination with the present invention.

All the advantages specifically stated herein do not necessarily apply to every conceivable embodiment of the invention. Further, such stated advantages of the invention are only exemplifications and should not be construed as the only advantages of this consequential invention. Additional features of the present invention are described with reference to the drawings and detailed description of the preferred embodiments.

BRIEF DESCRIPTION OF THE DRAWINGS

FIG. 1 is a sectional/look-through view of a motor vehicle showing a system of the invention.

DETAILED DESCRIPTION

FIG. 1 shows a preferred embodiment of the invention. The system has a controllable air intake system 2 leading to said interior of the vehicle 3, a detection system 1 for detecting one or more conditions of the vehicle 3 and means for controlling air intake to said interior of the vehicle 3 in response to such detection, the means for controlling the air intake including a fan 10, and ambient air valve 7, a filtered air valve 8 and a filter 5.

The vehicle 3 has an engine 11 and the detection system 1 can measure the rate of fuel consumption of the engine 11, the rate of engine exhaust of the vehicle 3, the rotation rate of the engine 11, the speed and the acceleration of the vehicle 3.

The system has an ambient air valve 7 for decreasing the air intake in response to such detection and an adjustable timer device 4 for, among other things, continuing the decreased air intake for only a predetermined period after said detection has terminated.

The system further comprises a recirculation valve 6 for recirculating air in the vehicle 3. The adjustable timer device 4 can also be adjusted for continuing the recirculation for only a predetermined period after a detected condition has terminated.

The detection system 1 can further detect changes in the level of conditions such as rate of fuel consumption, rate of engine exhaust, speed, acceleration and rate of rotation of the engine 11. The system further comprises a heating and cooling unit 9.

The operation of the preferred embodiment is as follows: In order to reduce the level of air pollution in the interior of a vehicle 3 it has a controllable air intake system 2 leading to the interior of the vehicle 3, and a detection system 1 for detecting one or more conditions such as rate of fuel consumption, rate of engine exhaust, rate of engine rotation, speed, acceleration and changes in the level of any of these, the method comprises the steps of (a) detecting said one or more conditions, and (b) controlling air intake conditions to said interior of the vehicle 3 in response to such detection; where said one or more conditions are causing and/or are being the result of a potential energy to kinetic energy conversion of said vehicle 3 and/or by said one or more conditions being the physical inclination 12 of the vehicle 3.

The air intake can be controlled by decreasing the air intake in response to the above mentioned detection and further controlled by continuing the decreased air intake for a predetermined period after said detection has terminated.

The air intake can further be controlled by filtering at least some of the air intake in response to the above mentioned detection and by continuing the filtering of the air intake for a predetermined period after said detection has terminated.

When the above mentioned conditions are detected air may also be recirculated in the vehicle and the recirculation may be continued for a predetermined period after said detection has terminated.

Normally when one or more of the mentioned conditions are detected ambient air valve 7 is shut and recirculation valve 6 and/or filtered air valve 8 are opened. Then when such conditions are no longer detected ambient air valve 7 opens up and recirculation valve 6 and/or filtered air valve 8 respectively are shut.

When the concept "a condition is detected" is used herein it means that "the condition above a predetermined minimum threshold is detected."

While the present description contains many specificities, these should not be construed as limitations on the scope of the invention, but rather as an exemplification of one/some preferred embodiment/s thereof. Many other variations are possible, for example, embodiments where the conditions detected are different from the above exemplified such as compression of gasses in the engine of the vehicle or power transfer to the wheels of the vehicle or measured wind pressure against the vehicle. There may also be other ways of controlling the air intake such as for example adding oxygen and removing carbon dioxide from a recirculated air stream. Accordingly, the scope of the invention should not be determined by the specific embodiment/s illustrated herein, but the full scope of the invention is further illustrated by the claims appended hereto.

I claim:

1. A method of reducing the level of air pollution in the interior of a vehicle having a controllable air intake system leading to said interior of the vehicle, comprising the steps of (a) detecting the physical inclination of the vehicle or a change of such physical inclination and (b) controlling air intake to said interior of the vehicle in response to such detection.

2. A method of reducing the level of air pollution in the interior of a vehicle having a controllable air intake system leading to said interior of the vehicle, an engine, and a detection system including means for measuring the rate of fuel consumption of the engine, comprising the steps of (a) measuring the rate of fuel consumption of the engine or a change in such rate of fuel consumption; and (b) controlling air intake to said interior of the vehicle in response to such detection.

3. A method of reducing the level of air pollution in the interior of a vehicle having a controllable air intake system leading to said interior of the vehicle, an engine, and a detection system including means for measuring the rate of engine exhaust of the engine, and comprising the steps of (a) measuring the rate of engine exhaust of the vehicle or a change in such rate of engine exhaust, and (b) controlling air intake to said interior of the vehicle in response to such detection.

4. A method of reducing the level of air pollution in the interior of a vehicle having a controllable air intake system leading to said interior of the vehicle, a detection system including means for measuring the rate of acceleration of said vehicle, comprising the steps of (a) measuring the rate of acceleration of said vehicle or a change in such rate of acceleration, and (b) controlling air intake to said interior of the vehicle in response to such detection.

5. A method according to claim 1, 2, 3, or 4, wherein step (b) includes the step of (c) decreasing the air intake in response to such detection.

6. A method according to claim 5, wherein step (c) includes the step of (d) continuing the decreased air intake for a predetermined period after said detection has terminated.

7. A method according to claim 1, 2, 3, or 4, wherein step (b) includes the step of (c) filtering at least some of the air intake in response to such detection.

8. A method according to claim 7, wherein step (c) includes the step of (d) continuing the filtered air intake for a predetermined period after said detection has terminated.

9. A method according to claim 1, 2, 3, or 4 including the step of (c) recirculating air in the vehicle in response to such detection.

10. A method according to claim 9, wherein step (c) includes the step of (d) continuing the recirculation for a predetermined period after said detection has terminated.

11. A system for reducing the level of air pollution in the interior of a vehicle comprising:

a controllable air intake system leading to said interior of the vehicle;

a detection system for detecting the the physical inclination of the vehicle or a change in said physical inclination; and means for controlling air intake to said interior of the vehicle in response to such detection.

12. A system for reducing the level of air pollution in the interior of a vehicle having an engine comprising:

a controllable air intake system leading to said interior of the vehicle;

a detection system for measuring the rate of fuel consumption of the engine or a change of said rate of fuel consumption; and means for controlling air intake to said interior of the vehicle in response to such detection.

13. A system for reducing the level of air pollution in the interior of a vehicle having an engine comprising:

a controllable air intake system leading to said interior of the vehicle;

a detection system for measuring the rate of engine exhaust of the vehicle or a change of said rate of engine exhaust; and means for controlling air intake to said interior of the vehicle in response to such detection.

14. A system for reducing the level of air pollution in the interior of a vehicle comprising:

a controllable air intake system leading to said interior of the vehicle;

a detection system for measuring the rate of acceleration of the vehicle or a change of said rate of acceleration; and means for controlling air intake to said interior of the vehicle in response to such detection.

15. A system according to claim 11, 12, 13 or 14, comprising means for decreasing the air intake in response to such detection.

16. A system according to claim 15, comprising means for continuing the decreased air intake for a predetermined period after said detection has terminated.

17. A system according to claim 11, 12, 13, or 14, comprising means for filtering at least come of the air intake in response to such detection.

18. A system according to claim 17, comprising means for continuing the filtered air intake for a predetermined period after said detection has terminated.

19. A system according to claim 11, 12, 13, or 14, comprising means for recirculating air in the vehicle in response to such detection.

20. A system according to claim 19, comprising means for continuing the recirculation for a predetermined period after said detection has terminated.

* * * * *

UNITED STATES PATENT AND TRADEMARK OFFICE
CERTIFICATE OF CORRECTION

PATENT NO. : 5,486,138
DATED : Jan. 23, 1996
INVENTOR(S) : Jens O. Sorensen

It is certified that error appears in the above-indentified patent and that said Letters Patent is hereby corrected as shown below:

In column 2, line 9, delete "from" and replace with --front--.

In the claims, column 6, line 7, delete "come" and replace with --some--.

Signed and Sealed this

Sixteenth Day of July, 1996

*Attest:*

BRUCE LEHMAN

*Attesting Officer*     *Commissioner of Patents and Trademarks*

UNITED STATES PATENT AND TRADEMARK OFFICE
CERTIFICATE OF CORRECTION

PATENT NO. : 5,486,138

DATED : Jan.. 23, 1996

INVENTOR(S) : Jens O. Sorensen

It is certified that error appears in the above-indentified patent and that said Letters Patent is hereby corrected as shown below:

In the abstract, line 9, delete "and/of" and replace with --and/or--

Signed and Sealed this

Sixth Day of August, 1996

Attest:

BRUCE LEHMAN

*Attesting Officer*  *Commissioner of Patents and Trademarks*